US010359100B2

(12) United States Patent
Mastie et al.

(10) Patent No.: US 10,359,100 B2
(45) Date of Patent: Jul. 23, 2019

(54) TRANSFER CASE FOR A DRIVE TRAIN (71) Applicant: BorgWarner Inc., Auburn Hills, MI (US)

(72) Inventors: Joseph D. Mastie, Belleville, MI (US); Sathya Vaidyanathan, Troy, MI (US)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 15/785,459

(22) Filed: Oct. 17, 2017

(65) Prior Publication Data

US 2018/0106333 A1 Apr. 19, 2018

Related U.S. Application Data (60) Provisional application No. 62/409,991, filed on Oct. 19, 2016.

(51) Int. Cl.
*F16H 3/54* (2006.01)
*B60K 17/344* (2006.01)
*F16H 48/30* (2012.01)
*B60K 23/08* (2006.01)

(52) U.S. Cl.
CPC .............. *F16H 3/54* (2013.01); *B60K 17/344* (2013.01); *B60K 17/352* (2013.01); *B60K 2023/0883* (2013.01); *F16H 2200/0034* (2013.01); *F16H 2200/2005* (2013.01); *F16H 2200/2035* (2013.01); *F16H 2200/2064* (2013.01); *F16H 2200/2094* (2013.01)

(58) Field of Classification Search
CPC ............... F16H 3/54; F16H 2200/0034; F16H 2200/2005; F16H 2200/2035; F16H 2200/2064; F16H 2200/2094; B60K 17/344; B60K 17/352; B60K 2023/0883
USPC ........................................................ 475/311
See application file for complete search history.

(56) References Cited

U.S. PATENT DOCUMENTS

| | | | | | |
|---|---|---|---|---|---|
| 4,848,508 | A | * | 7/1989 | Smirl | B60K 17/3465 180/248 |
| 4,854,413 | A | * | 8/1989 | Kameda | B60K 17/3467 180/247 |
| 4,976,671 | A | * | 12/1990 | Andersson | F16H 3/54 475/299 |
| 5,613,587 | A | * | 3/1997 | Baxter, Jr. | B60K 17/344 192/53.1 |

(Continued)

*Primary Examiner* — Leslie A Nicholson, III
(74) *Attorney, Agent, or Firm* — Miller, Matthias & Hull LLP (57) ABSTRACT

A transfer case (18) is disclosed. The transfer case (18) includes an input shaft (16) and a sun gear (56). The sun gear (56) includes a collar end (58) and a gear end (60) and at least a portion of the sun gear (56) circumscribes the input shaft (16). A hub (62) circumscribes the collar end (58) and the input shaft (16), and may be slidably move between a first position (64) and a second position (66) opposite the first position (64) along the input shaft (16) and the collar end (58). A plurality of planetary gears (70) is mounted in a carrier body (72) circumscribing the gear end (60), and the carrier body (72) is splined with the transfer case input shaft (16). A ring gear (78) circumscribes the plurality of planetary gears (70) mounted in the carrier body (72), and is integrally joined with an output shaft (20). The ring gear (78) is rotatable around the plurality of planetary gears (70).

15 Claims, 6 Drawing Sheets (56) References Cited

U.S. PATENT DOCUMENTS

| | | | | |
|---|---|---|---|---|
| 5,651,749 A | * | 7/1997 | Wilson | B60K 17/3462 |
| | | | | 180/247 |
| 5,655,986 A | * | 8/1997 | Wilson | B60K 17/3467 |
| | | | | 180/248 |
| 5,704,866 A | * | 1/1998 | Pritchard | F16H 3/089 |
| | | | | 180/248 |
| 6,117,036 A | * | 9/2000 | Lanzon | B60K 17/344 |
| | | | | 475/204 |
| 6,814,682 B2 | | 11/2004 | Spitale | |
| 8,951,156 B2 | * | 2/2015 | Klemm | F16H 63/3023 |
| | | | | 475/138 |
| 9,109,664 B2 | * | 8/2015 | Bowen | F16H 3/44 |
| 9,186,987 B2 | * | 11/2015 | Mastie | B60K 17/3467 |
| 2015/0158383 A1 | | 6/2015 | Mastie et al. | |
| 2016/0131253 A1 | * | 5/2016 | Pritchard | F16H 61/32 |
| | | | | 74/665 F |

\* cited by examiner

FIG. 6 ized to assign additional power from rear to front tires in all wheel drive and four wheel drive vehicles. Transfer cases may also include a set of low range gears for use in off-road applications.

TRANSFER CASE FOR A DRIVE TRAIN

CROSS-REFERENCE TO RELATED APPLICATIONS

This application claims the benefit of U.S. patent application Ser. No. 62/409,991 filed on Oct. 19, 2016, the disclosure of which is herein incorporated by reference in its entirety.

TECHNICAL FIELD

This disclosure generally relates to a drive train and, more particularly, to a transfer case for a drive train.

BACKGROUND

Generally speaking, a drive train includes a power source, a transmission, a drive shaft, and tires. The power source is rotatably coupled with the transmission, and the transmission may be configured to convert the power of the power source to a selectively geared output. The drive shaft is rotatably coupled to the transmission at one end, and is rotatably engaged with the tires through a differential and axles at the other end. As the power source rotates, its power is conveyed to the tires through the transmission, the drive shaft, the differential, and the axles.

The drive train may also include a transfer case positioned between the transmission and the drive shaft. Transfer cases are utilized to assign additional power from rear to front tires in all wheel drive and four wheel drive vehicles. Transfer cases may also include a set of low range gears for use in off-road applications.

With rising fuel prices, and increased environmental concern, customers are demanding more fuel efficient vehicles. In response, vehicle manufacturers are requiring original equipment manufacturers ("OEM") to provide systems and subsystems that meet this demand. For example, fuel system OEMs are providing injectors having better dispersive capability, thereby reducing the amount of fuel needed during a power stroke of an internal combustion engine. Accordingly, a need exists for transfer case manufacturers to provide products that help vehicle manufacturers create more fuel efficient vehicles.

U.S. Pat. No. 8,951,156 ("Klemm") discloses a transfer case with a planetary gear seat, a clutch collar, and an actuator. The transfer case has a low range mode when the clutch collar engages a planet gear carrier of the planetary gear set. The transfer case also has a standard 1:1 mode when the clutch collar engages a sun gear of the planetary gear set.

The present disclosure is directed to overcoming one or more problems set forth above and/or other problems associated with the prior art.

SUMMARY

In accordance with one aspect of the present disclosure, a transfer case for a drive train is disclosed. The transfer case may include a transfer case input shaft configured to rotatably engage with a power source, and a sun gear may circumscribe at least a portion of the transfer case input shaft. The sun gear may include a collar end and a gear end opposite the collar end. A hub may circumscribe the collar end and at least a portion of the transfer case input shaft that may be configured to slidably move between a first position and a second position opposite the first position along the transfer case input shaft and the collar end. A plurality of planetary gears may be mounted in a carrier body circumscribing the gear end, and the carrier body splined with the transfer case input shaft. A ring gear may circumscribe the plurality of planetary gears mounted in the carrier body integrally joined with a transfer case rear output shaft. The ring gear may be rotatable around the plurality of planetary gears mounted in the carrier body and the transfer case rear output shaft may be configured to rotatably couple with a drive shaft.

In accordance with another aspect of the present disclosure, a drive train is disclosed. The drive train may include a power source and a transmission may be rotationally coupled with the power source and be configured to convert power of the power source to a selectively geared output. A transfer case may be rotatably coupled to the transmission via a transfer case input shaft. The transfer case may include a sun gear circumscribing at least a portion of the transfer case input shaft and include a collar end and a gear end opposite the collar end, a hub circumscribing the collar end and at least a portion of the transfer case input shaft. The hub may be configured to slidably move between a first position and a second position opposite the first position along the transfer case input shaft and the collar end. A plurality of planetary gears mounted in a carrier body may circumscribe the gear end, and the carrier body may be splined with the transfer case input shaft. A ring gear may circumscribe the plurality of planetary gears mounted in the carrier body, and may be integrally joined with a transfer case rear output shaft. The ring gear may be rotatable around the plurality of planetary gears mounted in the carrier body.

In accordance with another embodiment of the present disclosure, a method of operating a transfer case for a drive train is disclosed. The method may include slidably moving a hub to a first position thereby locking a sun gear to a transfer case input shaft, and rotating the transfer case input shaft. Additionally, the method may include conveying power from the transfer case input shaft to a transfer case rear output shaft through the hub, the sun gear, a plurality of planetary gears mounted in a carrier body, and a ring gear integrally joined with the transfer case rear output shaft.

These and other aspects and features of the present disclosure will be more readily understood when read in conjunction with the accompanying drawings.

BRIEF DESCRIPTION

DETAILED DESCRIPTION OF THE DISCLOSURE

Various aspects of the disclosure will now be described with reference to the drawings, wherein like reference numbers refer to like elements, unless specified otherwise. Referring now to the drawings and with specific reference to FIG. 1, a drive train 10 is depicted and generally referred to by numeral 10. The drive train 10 includes a power source 12 rotationally coupled to a transmission 14. The power source 12 may be provided in any number of forms including, but not limited to, Otto and Diesel cycle engines internal combustion engines, electric motors, gas turbine engines, and the like. The transmission 14 may convert the power of the power source 12 to a selectively geared output. The operation of the power source 12 and the transmission 14 are understood to those of skill in the art, and therefore need not be described in detail to understand the invention disclosed herein.

Figure 1:
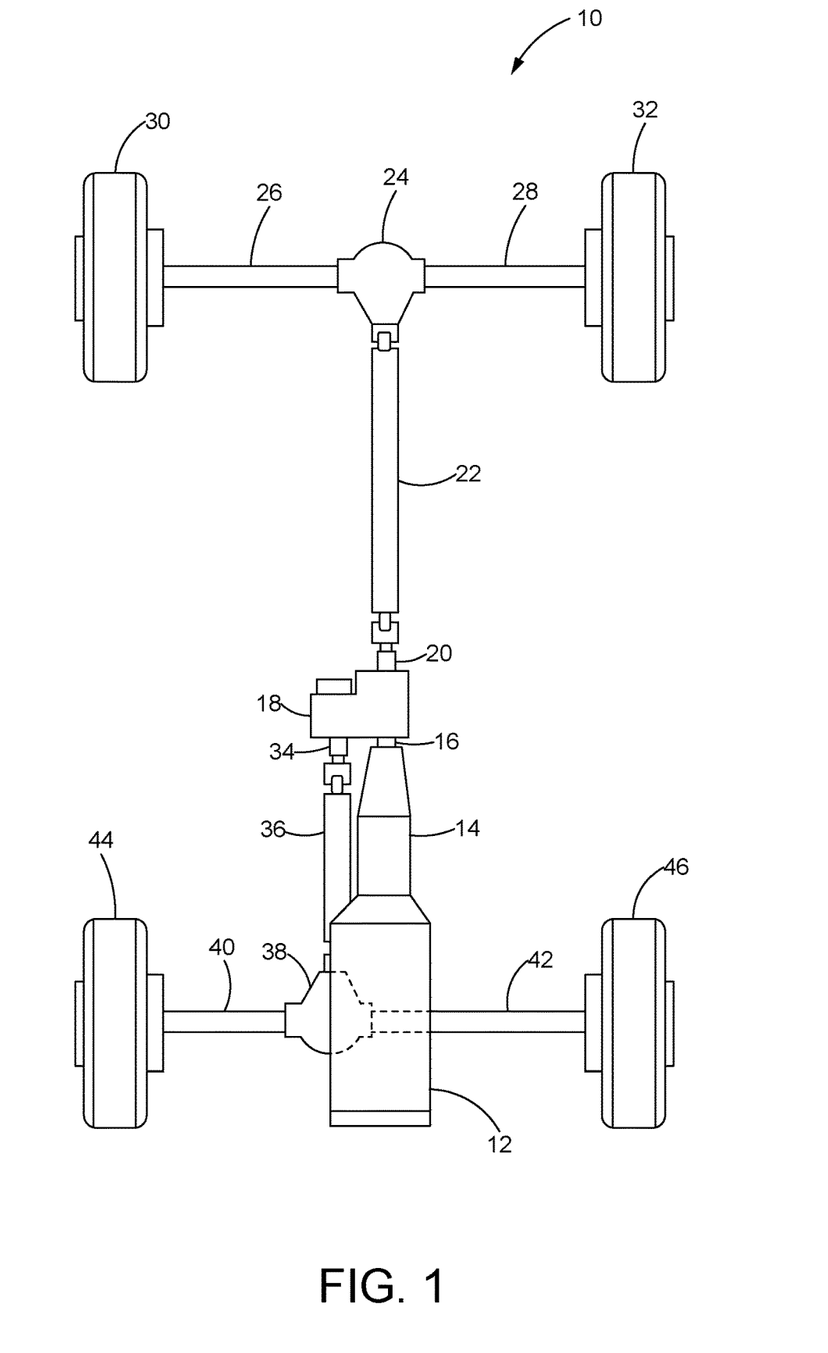
FIG. 1 is a plan view of a drive train manufactured in accordance with the present disclosure.

The transmission 14 may be rotatably coupled to a transfer case 18 via a transfer case input shaft 16. Furthermore, the transfer case 18 may also include a transfer case rear output shaft 20 rotatably coupled with a rear drive shaft 22. The rear drive shaft 22 may further be operationally engaged with a rear differential 24 where power from the power source 12 may be split between a right rear half shaft 26 and a left rear half shaft 28. The right rear half shaft 26 may be rotatably coupled with a right rear tire 30, and a left rear tire 32 may be rotatably coupled to the left rear half shaft 28. In operation, power from the power source 12 may be rotationally transferred to the right rear tire 30, and the left rear tire 32, via the transmission 14, transfer case 18, the rear drive shaft 22, rear differential 24, the right rear half shaft 26, and the left rear half shaft 28, thereby rotating the tires and propelling a vehicle to which the drive train 10 is part of down a roadway.

Additionally, the transfer case 18 may include a transfer case front output shaft 34 that is rotationally coupled to a forward prop shaft 36. The forward prop shaft 36 may also be operationally engaged with a front differential 38 where power from the power source 12 is split between a front right half shaft 40 and a front left half shaft 42. The front right half shaft 40 may be rotatably coupled with a right front tire 44, while the front left half shaft 42 may be rotatably coupled with a left front tire 46. During operation, power from the power source 12 may be rotationally transferred to the right front tire 44 and the left front tire 46 via the transmission 14, transfer case 18, the transfer case front output shaft 34, the forward prop shaft 36, the front differential 38, the front right half shaft 40, and the front left half shaft 42, thereby rotating the tires and propelling a vehicle to which the drive train 10 is part of down the roadway.

Figure 2:
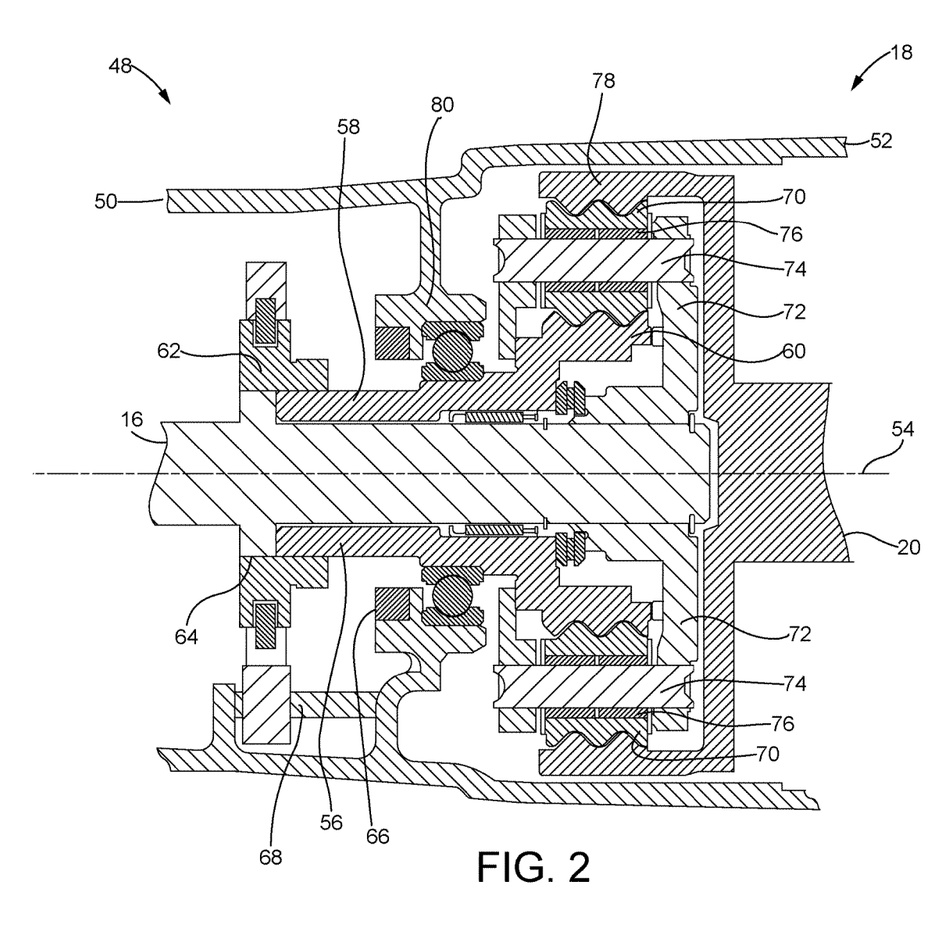
FIG. 2 is a cross-sectional view of a gearing section of a transfer case that may be utilized with the drive train of FIG. 1 in a direct drive mode.

Turning to FIG. 2, a cross-sectional view of a gearing section 48 of the transfer case 18 that may be utilized with the drive train of FIG. 1 is depicted. As shown there, the gearing section 48 may extend between a first end 50 and a second end 52 opposite the first end 50, and a longitudinal axis 54 may extend therethrough. The transfer case input shaft 16 and the transfer case rear output shaft 20 may rotate about the longitudinal axis 54.

Figure 3:
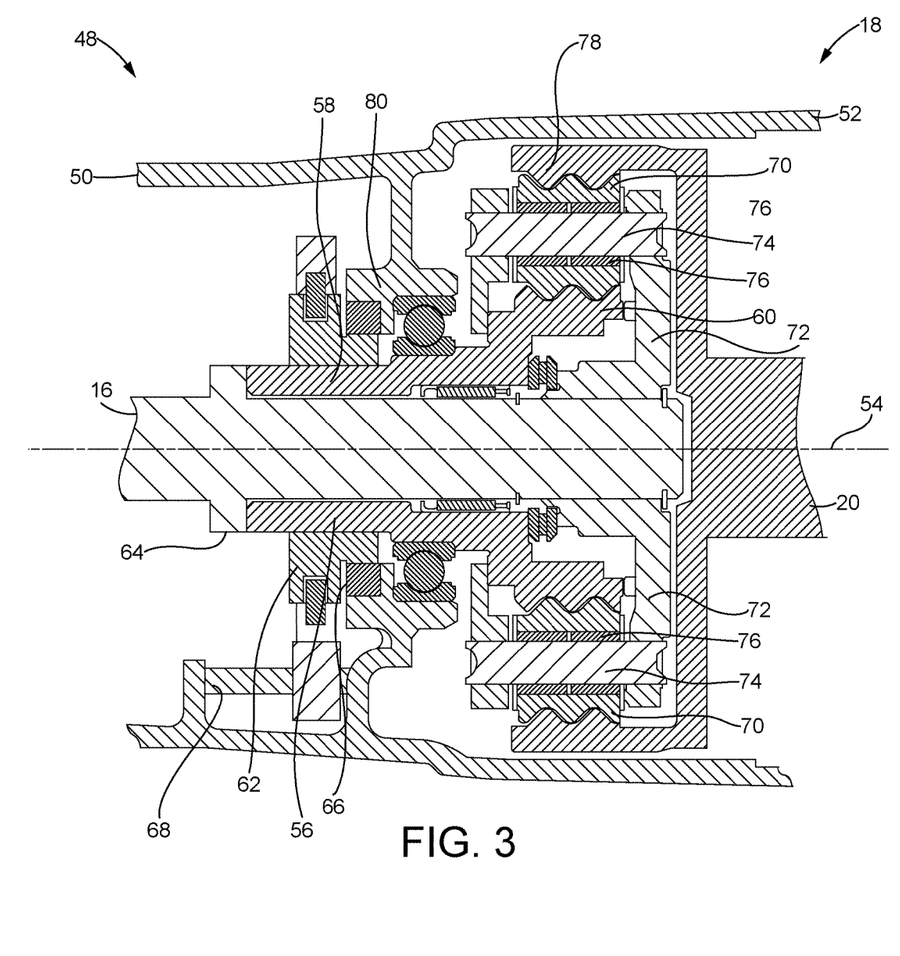
FIG. 3 is a cross-sectional view of the gearing section of transfer case of FIG. 2 in an overdrive mode.

Additionally, the gearing section 48 may include a sun gear 56 circumscribing at least a portion of the transfer case input shaft 16, and the sun gear 56 may include a collar end 58 and a gear end 60 opposite the collar end 58. A hub 62 may circumscribe the collar end 58 and at least a portion of the transfer case input shaft 16. Turning to FIGS. 2 and 3, the hub 62 may be configured to slidably move between a first position 64 and a second position 66 opposite the first position 64 along the transfer case input shaft 16 and the collar end 58 on a shift rail 68.

The gearing section 48 may also include a plurality of planetary gears 70 mounted in a carrier body 72 that circumscribe the gear end 60 of the sun gear 56. Further, the carrier body 72 may be splined to the transfer case input shaft 16. Therefore, the carrier body 72 may rotate in unison with the transfer case input shaft 16. The plurality of planetary gears 70 mounted in the carrier body 72 may each rotate about a carrier pinion pin 74, and rotate on one or more needles 76 positioned between the each carrier pinion pin 74 and each of the plurality of planetary gears 70.

A ring gear 78 may circumscribe the plurality of planetary gears 70 mounted in the carrier body 72, and the ring gear 78 may be integrally joined with the transfer case rear output shaft 20. For example, the ring gear 78 may be splined with the transfer case rear output shaft 20. Alternatively, the ring gear 78 may be fastened or adhered to the transfer case rear output shaft 20. In another example, the ring gear 78 may be integrally joined with the transfer case rear output shaft 20 as a unitary piece, such as by forging or casting. The ring gear 78 may be rotatable around the plurality of planetary gears 70 mounted in the carrier body 72, while the transfer case rear output shaft 20 may be configured to be rotatably coupled with the rear drive shaft 22.

When the hub 62 is in the first position 64, the sun gear 56 is locked to the transfer case input shaft 16. As the carrier body 72 is splined to the transfer case input shaft 16, when the sun gear 56 is locked to the transfer case input shaft 16, the transfer case rear output shaft 20 rotates at the same speed as the transfer case input shaft 16. In this state, the transfer case 18 is in a direct drive 1:1 mode. In this first mode of operation, power from the power source 12 is conveyed between the transfer case input shaft 16 and the transfer case rear output shaft 20 through the hub 62, the sun gear 56, the plurality of planetary gears 70 mounted in the carrier body 72 and the ring gear 78.

When the hub 62 is in the second position 66, as is depicted in FIG. 3, the sun gear 56 is locked to a transfer case housing 80. As the carrier body 72 is splined to the transfer case input shaft 16, when the sun gear 56 is locked to the transfer case housing 80, the transfer case rear output shaft 20 rotates at a greater speed than the transfer case input shaft 16. In this state, the transfer case 18 is in an overdrive mode (gear ratio < than 1:1). In this second mode of operation, power from the power source 12 is conveyed between the transfer case input shaft 16 and the transfer case rear output shaft 20 through the carrier body 72, the plurality of planetary gears 70 mounted in the carrier body 72, and the ring gear 78.

Figure 4:
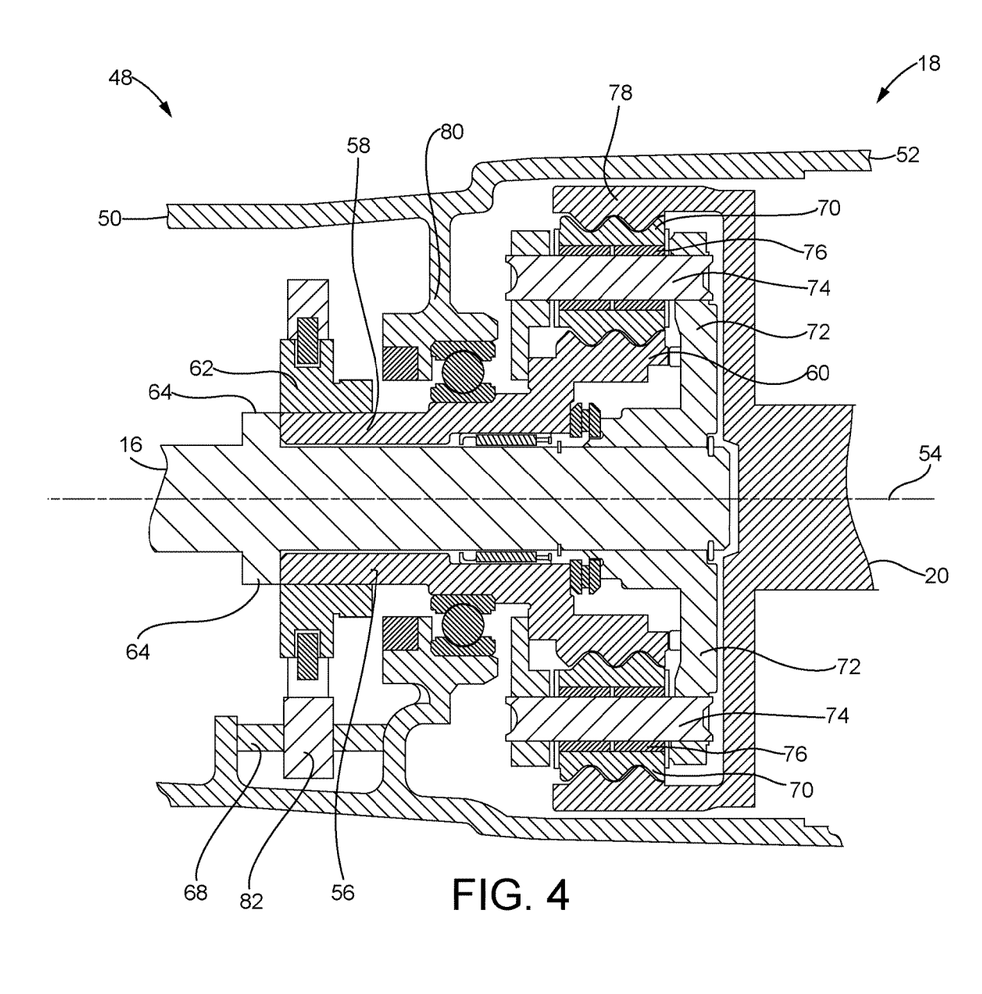
FIG. 4 is a cross-sectional view of the gearing section of the transfer case of FIG. 2 in a neutral mode.

FIG. 4 is a cross-sectional view of the gearing section 48 of the transfer case 18 depicting a neutral mode of operation. As seen therein, when the hub 62 is located between the first position 64 and the second position 66, the sun gear 56 is locked to neither the transfer case input shaft 16, nor the transfer case housing 80. As the carrier body 72 is splined to the transfer case input shaft, when in this mode, the transfer case rear output shaft 20 is disengaged from the transfer case input shaft 16. In this third mode of operation, the transfer case rear output shaft 20 may rotate at a slower speed, an equivalent speed, or a greater speed than the transfer case input shaft 16.

Figure 5:
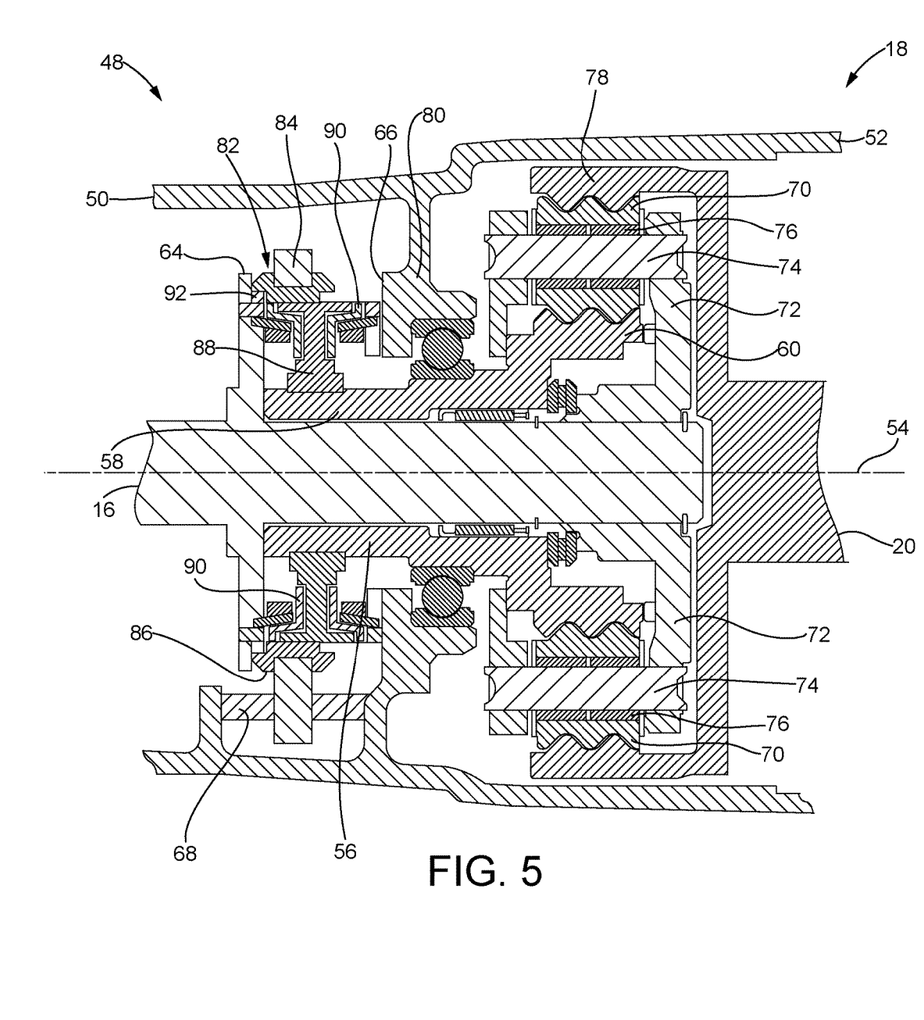
FIG. 5 is a cross-sectional view of the gearing section of the transfer case of FIG. 2 in the direct drive mode further depicting a synchronizer.

Turing to FIG. 5, in another embodiment of the present disclosure, the gearing section 48 of the transfer case 18 may additionally include a synchronizer 82 mounted on the shift rail 68. The synchronizer 82 may include a fork 84 configured to slidably move a sleeve 86 between the first position 64 and the second position 66 on a synchronizer hub 88. The synchronizer may also include a blocker ring 90 and the sleeve 86 may enter an engagement ring 92. This occurs while power from the power source 12 is being applied to the transfer case 18, and may thereby lock the sun gear 56 to the transfer case input shaft 16 or the transfer case housing 80, while moving. Sometimes this feature is known as "shift-on-the-fly." Therefore, the flow of power from the power source 12 conveyed between the transfer case input shaft 16 and the transfer case rear output shaft 20 is no different than described above and depicted in FIGS. 2 and 3. Further, when the sleeve 86 is located between the first position 64 and the second position 66, the sun gear 56 is locked to neither the transfer case input shaft 16, nor the transfer case housing 80, and the transfer case 18 experiences a neutral mode, as well.

INDUSTRIAL APPLICABILITY

In general, the present disclosure may find applicability in many industrial applications including, but not limited to, automobiles, sport utility vehicles, on-highway trucks, off-highway trucks, and the like. Although applicable to these industrial applications, the present disclosure finds particular usefulness in automotive drive trains for these industrial applications. As stated before, with rising fuel prices, and increased environmental concern, customers are demanding more fuel efficient vehicles. In response, vehicle manufacturers require suppliers to provide systems and subsystems that meet this demand. As such, the present disclosure finds usefulness by providing a transfer case within a drive train having an overdrive mode (gear ratio < than 1:1), thereby increasing fuel efficiency of vehicles utilizing transfer cases manufactured in accordance with the present disclosure.

Figure 6:
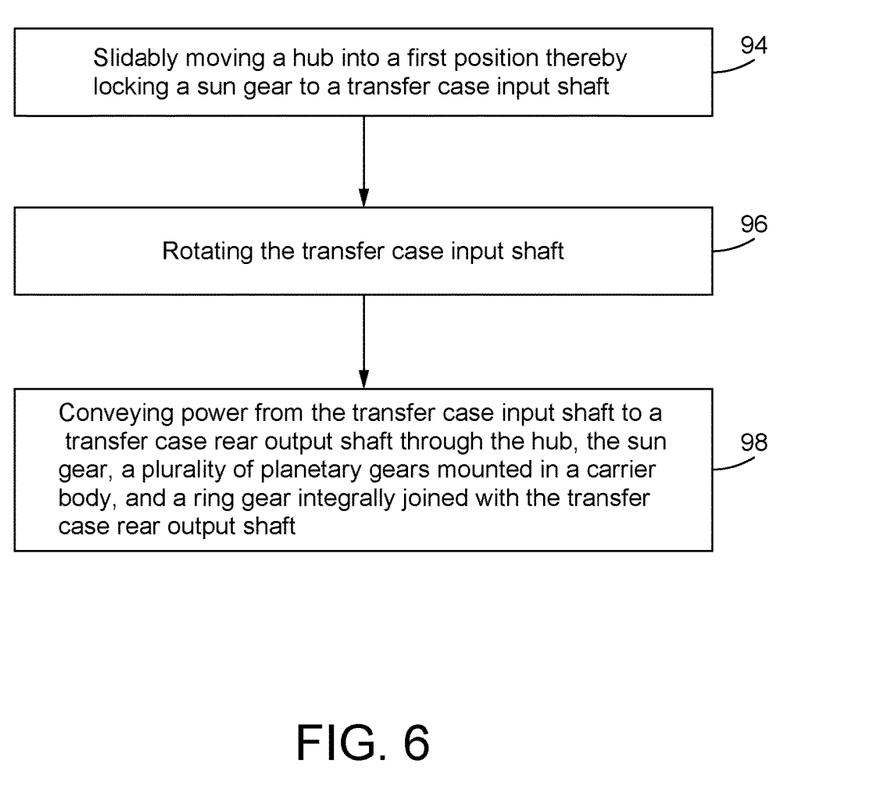
FIG. 6 is a flowchart demonstrating exemplary steps of a method for operating a transfer case in accordance with the present disclosure.

One exemplary example of a method of operating a transfer case 18 for a drive train 10 is depicted in the flowchart of FIG. 6. As shown, the method may comprise slidably moving a hub 62 to a first position 64 thereby locking a sun gear 56 to a transfer case input shaft 16 at block 94. When the hub 62 is in the first position 64, the sun gear 56 is locked to the transfer case input shaft 16.

In an additional step, the transfer case input shaft 16 may be rotated as is depicted at block 96. As the carrier body 72 is splined to the transfer case input shaft 16, when the sun gear 56 is locked to the transfer case input shaft 16, the transfer case rear output shaft 20 rotates at the same speed as the transfer case input shaft 16. In this state, the transfer case 18 is in a direct drive mode 1:1 mode. Accordingly, an additional step may include conveying power from the transfer case input shaft 16 to a transfer case rear output shaft 20 through the hub 62, the sun gear 56, a plurality of planetary gears 70 mounted in a carrier body 72, and a ring gear 78 integrally joined with the transfer case rear output shaft 20 as is shown at block 98.

In an additional embodiment, the method may include slidably moving the hub 62 to the second position 66, thereby locking the sun gear 56 to a transfer case housing 80. When the hub 62 is in the second position 66, the sun gear 56 is locked to the transfer case housing 80. As the carrier body 72 is splined to the transfer case input shaft 16, when the sun gear 56 is locked to the transfer case housing 80, the transfer case rear output shaft 20 rotates at a greater speed than the transfer case input shaft 16. In this state, the transfer case 18 is in an overdrive mode (gear ratio < than 1:1). Accordingly, in this state, this additional embodiment includes conveying power between the transfer case input shaft 16 and the transfer case rear output shaft 20 through the carrier body 72, the plurality of planetary gears 70 mounted in the carrier body 72, and the ring gear 78.

In an additional embodiment, the method may include slidably moving the hub 62 to a location between the first position 64 and the second position 66 thereby unlocking the sun gear 56 from both the transfer gear input shaft 16 and the transfer case housing 80. When the hub 62 is located between the first position 64 and the second position 66, the sun gear 56 is locked to neither the transfer case input shaft 16, nor the transfer case housing 80. As the carrier body 72 is splined to the transfer case input shaft 16, when in this mode, the transfer case rear output shaft 20 is disengaged from the transfer case input shaft 16. In this state, the transfer case 18 is in the neutral mode. As such, the transfer case rear output shaft 20 may rotate at a slower speed, an equivalent speed, or a greater speed than the transfer case input shaft 16.

The above description is meant to be representative only, and thus modifications may be made to the embodiments described herein without departing from the scope of the disclosure. Thus, these modifications fall within the scope of present disclosure and are intended to fall within the appended claims.

What is claimed is:

1. A transfer case for a drive train, comprising:
a transfer case input shaft configured to rotatably engage with a power source;
a sun gear circumscribing at least a portion of the transfer case input shaft, and including a collar end and a gear end opposite the collar end;
a hub circumscribing the collar end and at least a portion of the transfer case input shaft, and configured to slidably move between a first position and a second position opposite the first position along the transfer case input shaft and the collar end;
a plurality of planetary gears mounted in a carrier body circumscribing the gear end, the carrier body being splined with the transfer case input shaft; and
a ring gear circumscribing the plurality of planetary gears mounted in the carrier body integrally joined with a transfer case rear output shaft, the ring gear rotatable around the plurality of planetary gears mounted in the carrier body, the transfer case rear output shaft configured to rotatably couple with a rear drive shaft.

2. The transfer case according to claim 1, wherein while the hub is in the first position the sun gear is locked to the transfer case input shaft thereby causing the transfer case rear output shaft to rotate at the same speed as the transfer case input shaft.

3. The transfer case according to claim 1, wherein while the hub is in the first position the sun gear is locked to the transfer case input shaft and power from the power source is conveyed between the transfer case input shaft and the transfer case rear output shaft through the hub, the sun gear, the plurality of planetary gears mounted in the carrier body, and the ring gear.

4. The transfer case according to claim 1, wherein while the hub is in the second position the sun gear is locked to a transfer case housing thereby causing the transfer case rear output shaft to rotate at a greater speed than the transfer case input shaft.

5. The transfer case according to claim 1, wherein while the hub is in the second position the sun gear is locked to a transfer case housing and power from the power source is conveyed between the transfer case input shaft and the transfer case rear output shaft through the carrier body, the plurality of planetary gears mounted in the carrier body, and the ring gear.

6. The transfer case according to claim 1, wherein while the hub is located between the first position and the second position, the sun gear is locked to neither the transfer case input shaft nor a transfer case housing thereby disengaging the transfer case input shaft from the transfer case rear output shaft.

7. A drive train, comprising:
a power source;
a transmission rotationally coupled with the power source configured to convert power of the power source to a selectively geared output; and
a transfer case rotatably coupled to the transmission via a transfer case input shaft including a sun gear circumscribing at least a portion of the transfer case input shaft and including a collar end and a gear end opposite the collar end, a hub circumscribing the collar end and at least a portion of the transfer case input shaft, and configured to slidably move between a first position and a second position opposite the first position along the transfer case input shaft and the collar end, a plurality of planetary gears mounted in a carrier body circumscribing the gear end, the carrier body being splined with the transfer case input shaft, and a ring gear circumscribing the plurality of planetary gears mounted in the carrier body integrally joined with a transfer case rear output shaft, the ring gear rotatable around the plurality of planetary gears mounted in the carrier body.

8. The drive train according to claim 7, wherein while the hub is in the first position the sun gear is locked to the transfer case input shaft thereby causing the transfer case rear output shaft to rotate at the same speed as the transfer case input shaft.

9. The drive train according to claim 7 wherein while the hub is in the first position the sun gear is locked to the transfer case input shaft and power from the power source is conveyed between the transfer case input shaft and the transfer case rear output shaft through the hub, the sun gear, the plurality of planetary gears mounted in the carrier body, and the ring gear.

10. The drive train according to claim 7, wherein while the hub is in the second position the sun gear is locked to a transfer case housing thereby causing the transfer case rear output shaft to rotate at a greater speed than the transfer case input shaft.

11. The drive train according to claim 7, wherein while the hub is in the second position the sun gear is locked to a transfer case housing and power from the power source is conveyed between the transfer case input shaft and the transfer case rear output shaft through the carrier body, the plurality of planetary gears mounted in the carrier body, and the ring gear.

12. The drive train according to claim 7, wherein while the hub is located between the first position and the second position, the sun gear is locked to neither the transfer case input shaft nor a transfer case housing thereby disengaging the transfer case input shaft from the transfer case rear output shaft.

13. A method of operating a transfer case for a drive train, comprising:
slidably moving a hub to a first position thereby locking a sun gear to a transfer case input shaft, the hub configured to slidably move between the first position and a second position opposite the first position along the transfer case input shaft;
rotating the transfer case input shaft;
conveying power from the transfer case input shaft to a transfer case rear output shaft through the hub, the sun gear, a plurality of planetary gears mounted in a carrier body, and a ring gear integrally joined with the transfer case rear output shaft.

14. The method of claim 13, slidably moving the hub to a second position thereby locking the sun gear to a transfer case housing, rotating the transfer case input shaft, and conveying power from the transfer case input shaft to the transfer case rear output shaft through a carrier body, the plurality of planetary gears mounted in the carrier body, and the ring gear integrally joined with the transfer case rear output shaft.

15. The method of claim 13, slidably moving the hub to a location between the first position and a second position thereby unlocking the sun gear from both the transfer case input shaft and a transfer case housing and disengaging the transfer case input shaft from the transfer case rear output shaft.

\* \* \* \* \*